(12) United States Patent
Uotani

(10) Patent No.: US 8,755,074 B2
(45) Date of Patent: Jun. 17, 2014

(54) UPDATING A JOB LIST IN A SERVER AFTER SHUTDOWN WHEN THE SERVER IS REBOOTED

(75) Inventor: Kenichirou Uotani, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 137 days.

(21) Appl. No.: 13/363,700

(22) Filed: Feb. 1, 2012

(65) Prior Publication Data

US 2012/0206761 A1    Aug. 16, 2012

(30) Foreign Application Priority Data

Feb. 10, 2011 (JP) ................................. 2011-027505

(51) Int. Cl.
*G06F 3/12* (2006.01)

(52) U.S. Cl.
USPC ....................................................... 358/1.15

(58) Field of Classification Search
USPC ....................................................... 358/1.15
See application file for complete search history.

(56) References Cited

U.S. PATENT DOCUMENTS

| | | | |
|---|---|---|---|
| 6,256,750 B1* | 7/2001 | Takeda | 714/11 |
| 2004/0051901 A1* | 3/2004 | Fukuda | 358/1.16 |
| 2009/0225360 A1* | 9/2009 | Shirai | 358/1.15 |

FOREIGN PATENT DOCUMENTS

| | | | |
|---|---|---|---|
| JP | 10-240470 A | 9/1998 | |
| JP | 2007-183359 A | 7/2007 | |

* cited by examiner

*Primary Examiner* — Eric A Rust
(74) *Attorney, Agent, or Firm* — Canon USA, Inc., IP Division

(57) ABSTRACT

A print server apparatus to communicate with a printer includes a holding unit, a change unit, a storing unit, an acquisition unit, and an update unit. The holding unit stores a job list including a plurality of print job data pieces. In response to a shutdown instruction being received, the change unit discards print job data whose status of issuance processing is in issuance, instructs the printer to cancel the print job, and discards print job data whose status of issuance processing is in issuance wait. The storing unit stores the changed job list as a first job list. The acquisition unit acquires from the printer, a job list including a plurality of print job data pieces as a second job list in response to the print server apparatus being rebooted. The update unit updates the stored first job list based on the acquired second job list.

15 Claims, 9 Drawing Sheets

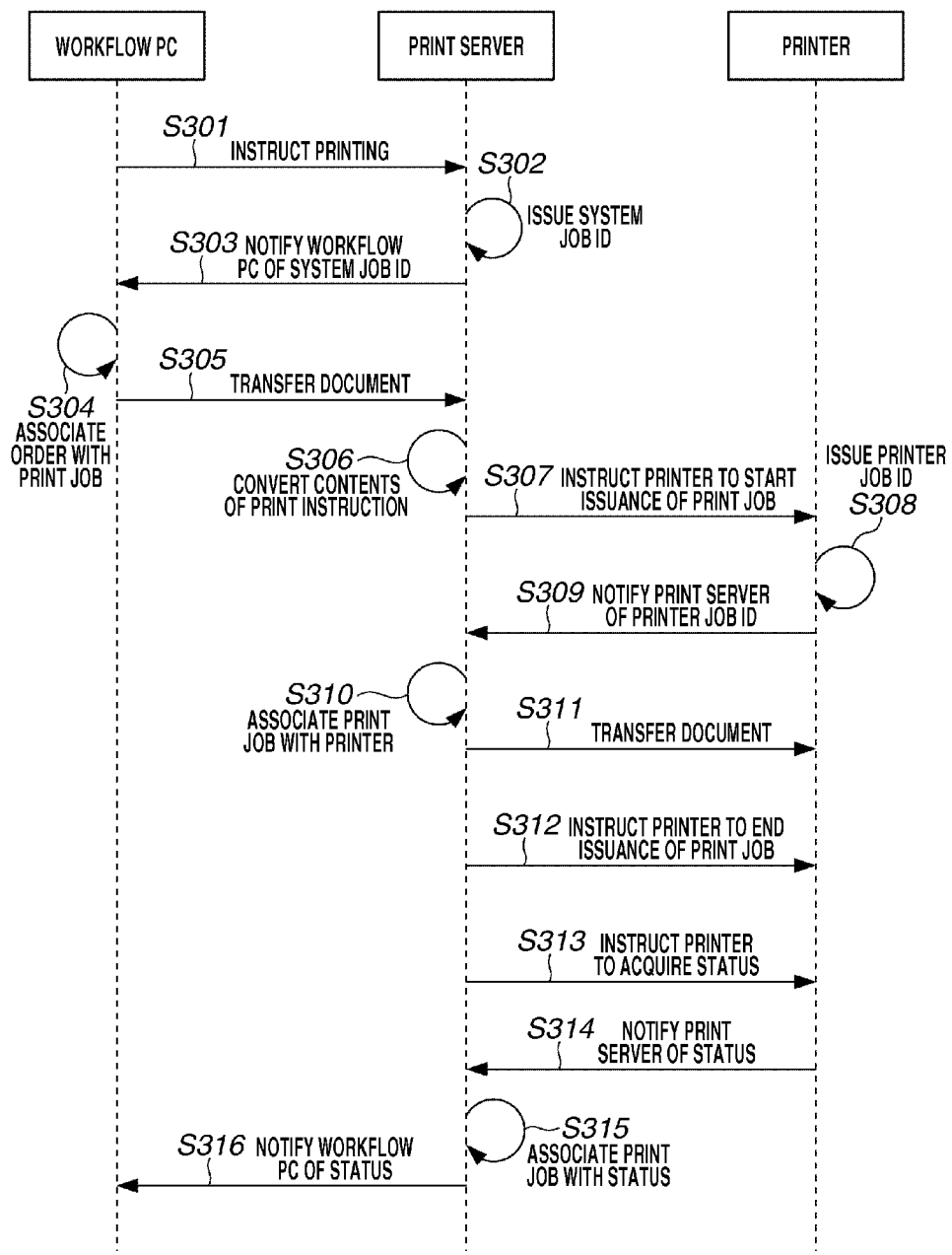

| SYSTEM JOB ID | PRINTER JO ID | JOB PROGRESS | JOB ISSUANCE PROCESSING STATUS | ORDER ID | JOB NAME | JOB ISSUER |
|---|---|---|---|---|---|---|
| S_0001 | P1_0011 | PRINT COMPLETION | ISSUED | Order_0101-0001 | PHOTO BOOK_1 | WORKFLOW_1 |
| S_0002 | P1_0012 | BEING PRINTED | ISSUED | Order_0102-0001 | SINGLE PHOTOGRAPH_1 | WORKFLOW_2 |
| S_0003 | P1_0013 | IN IMAGE PROCESSING | ISSUED | Order_0103-0001 | PHOTO BOOK_2 | WORKFLOW_2 |
| S_0004 | P1_0014 | BEING PRINTED | ISSUED | Order_0104-0001 | PHOTO BOOK_3 | WORKFLOW_1 |
| S_0005 | P1_0015 | BEING RECEIVED | BEING ISSUED | Order_0104-0002 | SINGLE PHOTOGRAPH_2 | WORKFLOW_1 |
| S_0006 | P1_0016 | PROCESSING WAIT | ISSUANCE WAIT | Order_0105-0001 | PHOTO BOOK_4 | WORKFLOW_2 |

400(b)

| SYSTEM JOB ID | PRINTER JO ID | JOB PROGRESS | JOB ISSUANCE PROCESSING STATUS | ORDER ID | JOB NAME | JOB ISSUER |
|---|---|---|---|---|---|---|
| S_0002 | P1_0012 | BEING PRINTED | ISSUED | Order_0102-0001 | SINGLE PHOTOGRAPH_1 | WORKFLOW_2 |
| S_0003 | P1_0013 | IN IMAGE PROCESSING | ISSUED | Order_0103-0001 | PHOTO BOOK_2 | WORKFLOW_2 |
| S_0004 | P1_0014 | BEING PRINTED | ISSUED | Order_0104-0001 | PHOTO BOOK_3 | WORKFLOW_1 |
| S_0005 | P1_0015 | BEING RECEIVED | BEING ISSUED | Order_0104-0002 | SINGLE PHOTOGRAPH_2 | WORKFLOW_1 |
| S_0006 | P1_0016 | PROCESSING WAIT | ISSUANCE WAIT | Order_0105-0001 | PHOTO BOOK_4 | WORKFLOW_2 |

400(c)

| SYSTEM JOB ID | PRINTER JO ID | JOB PROGRESS | JOB ISSUANCE PROCESSING STATUS | ORDER ID | JOB NAME | JOB ISSUER |
|---|---|---|---|---|---|---|
| S_0002 | P1_0012 | BEING PRINTED | ISSUED | Order_0102-0001 | SINGLE PHOTOGRAPH_1 | WORKFLOW_2 |
| S_0003 | P1_0013 | IN IMAGE PROCESSING | ISSUED | Order_0103-0001 | PHOTO BOOK_2 | WORKFLOW_2 |
| S_0004 | P1_0014 | BEING PRINTED | ISSUED | Order_0104-0001 | PHOTO BOOK_3 | WORKFLOW_1 |

400(d)

| PRINTER JO ID | JOB PROGRESS | ORDER ID | JOB NAME | JOB ISSUER |
|---|---|---|---|---|
| P1_0012 | PRINT COMPLETION | Order_0102-0001 | SINGLE PHOTOGRAPH_1 | WORKFLOW_2 |
| P1_0013 | BEING PRINTED | Order_0103-0001 | PHOTO BOOK_2 | WORKFLOW_2 |
| P1_0014 | BEING PRINTED | Order_0104-0001 | PHOTO BOOK_3 | WORKFLOW_1 |

400(e)

| SYSTEM JOB ID | PRINTER JO ID | JOB PROGRESS | JOB ISSUANCE PROCESSING STATUS | ORDER ID | JOB NAME | JOB ISSUER |
|---|---|---|---|---|---|---|
| S_0003 | P1_0013 | BEING PRINTED | ISSUED | Order_0103-0001 | PHOTO BOOK_2 | WORKFLOW_2 |
| S_0004 | P1_0014 | BEING PRINTED | ISSUED | Order_0104-0001 | PHOTO BOOK_3 | WORKFLOW_1 |

| ORDER ID | PRINTER | SYSTEM JOB ID | JOB PROGRESS |
|---|---|---|---|
| Order_0101-0001 | PRINTER 1 | S_0001 | PRINT COMPLETION |
| Order_0102-0001 | PRINTER 1 | S_0002 | BEING PRINTED |
| Order_0103-0001 | PRINTER 1 | S_0003 | IN IMAGE PROCESSING |
| Order_0104-0001 | PRINTER 1 | S_0004 | BEING PRINTED |
| Order_0104-0002 | PRINTER 1 | S_0005 | BEING RECEIVED |
| Order_0105-0001 | PRINTER 1 | S_0006 | PROCESSING WAIT |

700(b)

| ORDER ID | PRINTER | SYSTEM JOB ID | JOB PROGRESS |
|---|---|---|---|
| Order_0101-0001 | PRINTER 1 | S_0001 | PRINT COMPLETION |
| Order_0102-0001 | PRINTER 1 | S_0002 | BEING PRINTED |
| Order_0103-0001 | PRINTER 1 | S_0003 | IN IMAGE PROCESSING |
| Order_0104-0001 | PRINTER 1 | S_0004 | BEING PRINTED |
| Order_0104-0002 | PRINTER 1 | — | STILL TO BE ISSUED |
| Order_0105-0001 | PRINTER 1 | — | STILL TO BE ISSUED |

700(c)

| ORDER ID | PRINTER | SYSTEM JOB ID | JOB PROGRESS |
|---|---|---|---|
| Order_0101-0001 | PRINTER 1 | S_0001 | PRINT COMPLETION |
| Order_0102-0001 | PRINTER 1 | S_0002 | PRINT COMPLETION |
| Order_0103-0001 | PRINTER 1 | S_0003 | BEING PRINTED |
| Order_0104-0001 | PRINTER 1 | S_0004 | BEING PRINTED |
| Order_0104-0002 | PRINTER 1 | — | STILL TO BE ISSUED |
| Order_0105-0001 | PRINTER 1 | — | STILL TO BE ISSUED |

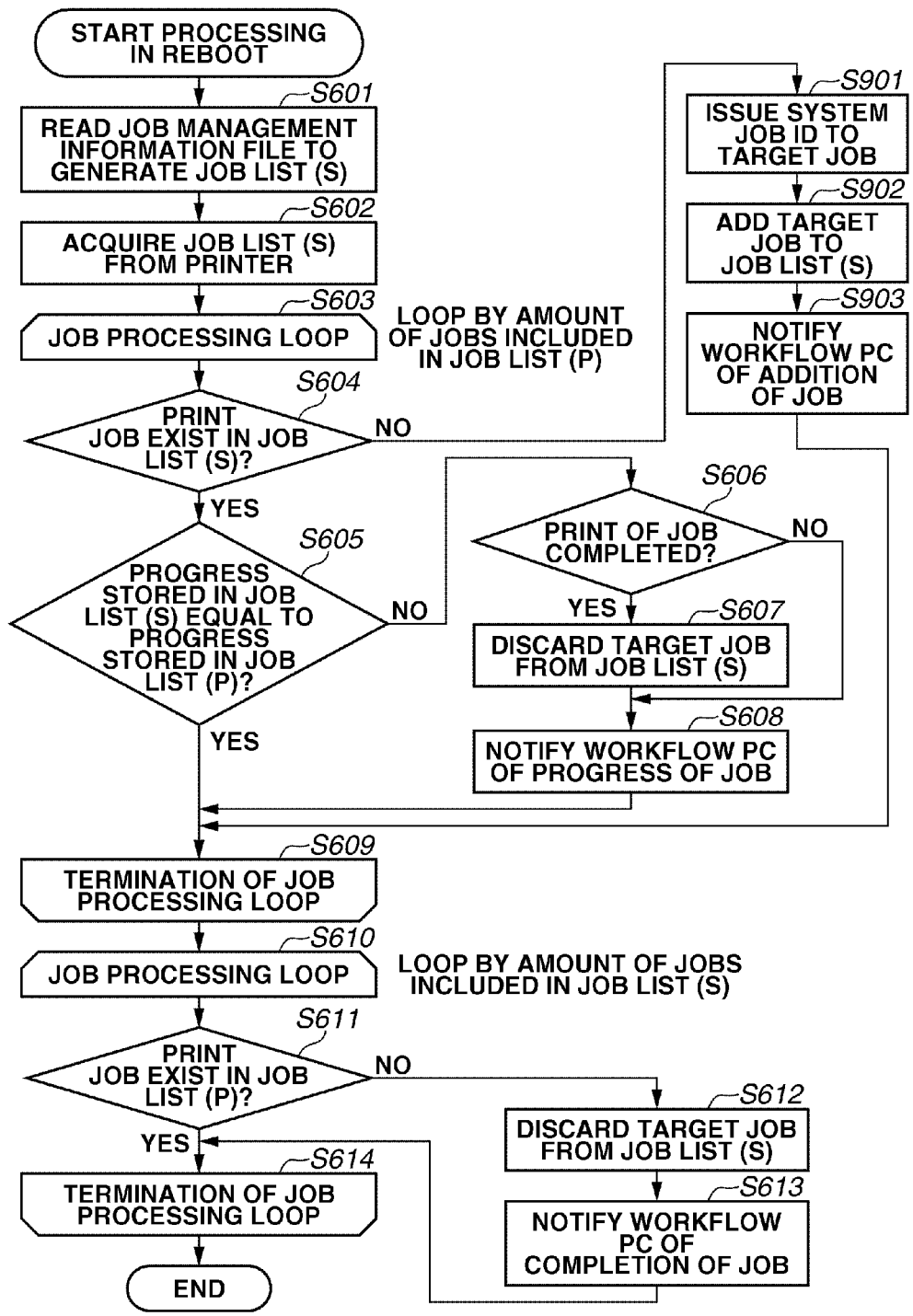

UPDATING A JOB LIST IN A SERVER AFTER SHUTDOWN WHEN THE SERVER IS REBOOTED

BACKGROUND OF THE INVENTION

1. Field of the Invention

The present invention relates to a print server apparatus, an information processing method, and a program.

2. Description of the Related Art

Conventionally, a photographic printing system with a photographic print producing apparatus has received order information, that is information about an order to image data. There has been a technique for detecting the status of development processing such as the start, the middle, and the end of processing in the photographic print producing apparatus corresponding to the order information. The technique prohibits a subsequent undeveloped photographic film from being inputted until at least any one of the statuses is detected, so that the development processing can be associated with the undeveloped photographic film corresponding to the order information on a one-to-one basis. This technique realizes the development processing of the undeveloped photographic film corresponding to the order information correctly and surely (refer to Japanese Patent Application Laid-Open No. 2007-183359).

If failure occurs in a print server of a network print system, a client set in a backup server can act as the server. Accordingly, there has been such a technique as to enable printing from the network printer in response to an irregular stop of the server. More specifically, in the system in which print data is spooled by each client, only job information is transmitted to the server, and the server executes job sequence control, the job sequence control is also stored in a client which is set as a backup server. If the server irregularly stops in this system, the client functions instead of the server and each of other clients confirms whether the jobs registered by each client are correctly registered to allow reproducing normal print output (refer to Japanese Patent Application Laid-Open No. 10-240470).

In the system discussed in Japanese Patent Application Laid-Open No. 2007-183359, however, once an order reception device is shut down, order information and a status acquired from the development processing may be erased.

In the system discussed in Japanese Patent Application Laid-Open No. 10-240470, on the other hand, a client computer other than a dedicated server is set as the backup server to solve an issue which may arise if the dedicated server is shut down.

In the system discussed in Japanese Patent Application Laid-Open No. 10-240470, however, at least another backup server other than the dedicated server is required to cause an issue that a resource is increased. Further, while the dedicated server for managing job information (corresponding to order information in the print system) and status is being operated, information needs to be copied to the backup server as needed. This operation increases traffic between the dedicated server and the backup server. The spool needs to be made on the side of the client. Further, there is another issue that if the dedicated server is shut down when the copy is not yet ended, the status of the job information which has not yet been stored in the backup server cannot be confirmed.

More specifically, the above issues may occur under the condition that a network problem between the dedicated server and the backup server and/or the compulsive shutdown of the dedicated server occur. Further, if a job identification (ID) is acquired again from the client after the backup server is established, the whole job information needs to be checked. The job information refers to a document name, an owner, the number of pages, a sheet size, a data size, and priority information of print data. It cannot be said that there is nothing to coincide with each other, so that accuracy cannot be estimated.

SUMMARY OF THE INVENTION

The present invention is directed to a technique capable of surely reproducing a progress status of a job after reboot even if a server is shut down.

According to an aspect of the present invention, a print server apparatus to communicate with a printer includes a holding unit configured to store a job list including a plurality of print job data pieces, wherein the plurality of print job data pieces includes a progress status of a print job and a status of issuance processing of the print job in a temporary storage apparatus, a change unit configured to, in response to a shutdown instruction being received, discard print job data whose status of issuance processing is in issuance among the print job data pieces included in the job list from the job list, instruct the printer to cancel the print job of the print job data, and discard print job data whose status of issuance processing is in issuance wait among the print job data pieces included in the job list from the job list, a storing unit configured to store the job list changed by the change unit as a first job list in a storage apparatus, an acquisition unit configured to acquire from the printer, a job list including a plurality of print job data pieces including a progress status of a print job and a status of issuance processing of the print job as a second job list in response to the print server apparatus being rebooted, and an update unit configured to update the first job list stored in the storage apparatus based on the second job list acquired by the acquisition unit.

According to the present invention, even if a server is shut down, a progress status of a job can be surely reproduced after reboot.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is an example of a sequence diagram illustrating a flow in which the print server manages a progress status of a print job corresponding to an order in a case where a workflow personal computer (PC) instructs a printer to print each order.

FIG. 4 illustrates examples of job lists stored in the print server.

FIG. 7 illustrates examples of order lists.

FIG. 8 is a flow chart illustrating an example of operations in a case where the print server is rebooted.

DESCRIPTION OF THE EMBODIMENTS

Various exemplary embodiments, features, and aspects of the invention will be described in detail below with reference to the drawings.

[Configuration of Printing System]

Figure 1:
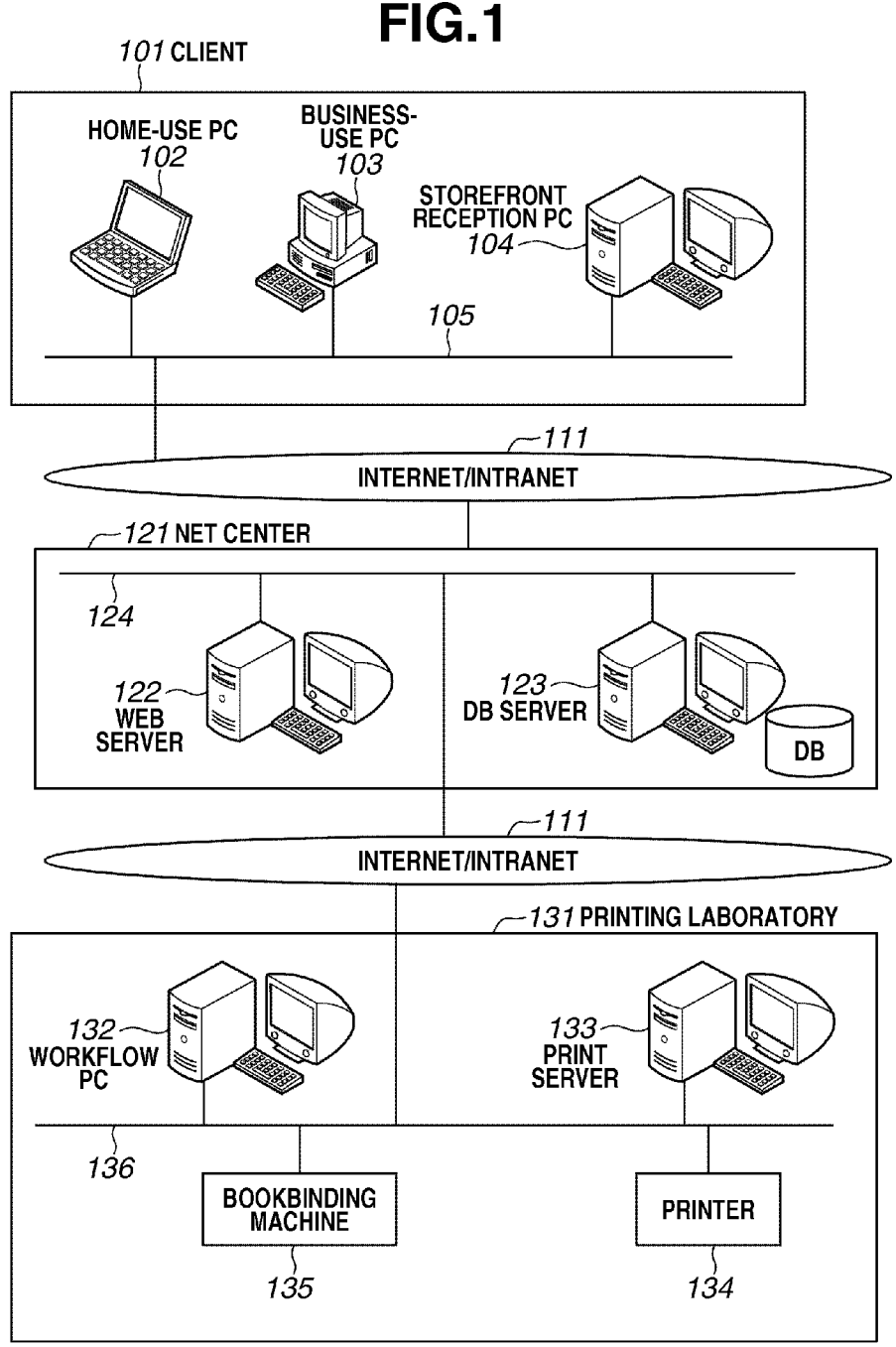
FIG. 1 is a schematic diagram illustrating an example of a system configuration of a printing system.

FIG. 1 is a schematic diagram illustrating an example of a system configuration of a printing system according to an exemplary embodiment. The environment of the entire printing system in the following description is set for the sake of easy understanding of the present exemplary embodiment, so that the present exemplary embodiment is not limited to the environment.

A client 101 may include a home-use personal computer (PC) 102, a business-use PC 103, and a storefront reception PC 104. The home-use PC 102 is connected to the Internet at a general user's home. The business-use PC 103 is connected to an in-house intranet. The storefront reception PC 104 is connected to the Internet or an in-store intranet at the storefront of a printing factory which provides commercial printing such as "digital photographic printing services."

A net center 121 may include a web server 122 and a database (DB) server 123. The web server 122 is a computer system for providing a user with upload contents for uploading a print request, a document, or the like. The DB server 123 is a computer system for storing an uploaded print request as a purchase order (order slip) and an electronically uploaded document. The web server 122 and the DB server 123 may be mounted in one housing, however, for the sake of convenience, the web server 122 and the DB server 123 are separately mounted in two housings in the present exemplary embodiment.

A plurality of printing laboratories 131 may be arranged in the net center 121. The plurality of printing laboratories 131 can be distributed and link to each other in the net center 121 based on contents of a print request or information of the printer mounted on the printing laboratory 131.

The printing laboratory 131 includes a workflow PC 132, a print server 133, a printer 134, and a bookbinding machine 135. The workflow PC 132 periodically collects order slips and documents stored in the net center 121 from the DB server 123, creates a schedule of print processing for the collected orders (the print requests described in the order slips), and issues instructions for the print processing. The workflow PC 132 is an example of an information processing apparatus. The print server 133 is an example of a print server apparatus (computer). The printer 134 actually outputs print products. The bookbinding machine 135 is used for offline bookbinding after printing is finished.

The configuration of the printing laboratory and the environment surrounding the printing laboratory such as the net center and client which are on the upstream side of the printing laboratory are merely an example, so that the present invention is not limited to the example. In the example of the present exemplary embodiment, the client 101 is connected to the net center 121 via an internet/intranet 111, and the net center 121 is connected to the printing laboratory 131 via the internet/intranet 111. In general, the client 101 is frequently connected to the net center 121 via The internet, and the net center 121 is frequently connected to the printing laboratory 131 via an intranet using a privately leased line. However, the present exemplary embodiment is not limited to such an environment, but applicable also to an environment that the net center 121 exists in the printing laboratory 131.

The home-use PC 102 and the business-use PC 103 of the client 101 include a general browser for browsing upload contents provided by the web server 122. Document data can be uploaded using the upload contents.

The web server 122 provides the upload contents. The upload contents include editing control for inputting setting of print appearance, the number of copies, and the sheet size of bookbinding (which are collectively referred to as "print setting"), delivery date, client information, and a delivery destination and file designation control for uploading the document data. The calculation of a fee according to the input contents of request and the determination processing of input items are realized by a service module operating on the web server 122, however, these are formed of a general logic, so that the description thereof is omitted herein. The web server 122 stores the order slips in which the determined print requests are recorded (the contents of the print request and a file name of the document data are written therein) and the file of the document data in the DB server 123.

The DB server 123 in which a general database management system is installed can transmit a desired order slip and document data in response to a request for acquiring data from the workflow PC 132. A DB schemer (not illustrated) primarily includes tables such as a print laboratory master (including information about place and contact address, print master, and bookbinding machine master as members), a print master (information about device configuration such as color/monochrome, the number of prints, support sheet, and option), and a bookbinding machine master (information about case binding machine and a puncher machine). The DB server 123 refers to the tables of the DB schemer to allow the workflow PC 132 in the printing laboratory 131 to receive the order allocated to the printing laboratory 131 to which the workflow PC itself belongs.

The workflow PC 132 is notified of the determination of the order from the web server 122 and collects the order slip and the document data file from the DB server 123. The workflow PC 132 creates a schedule of print processing for each order based on the contents of the collected purchase orders, a printer, and an operational status of the printer 134. The workflow PC 132 adds identification information to each order slip to manage the schedule of print processing for each order. Further, the workflow PC 132 instructs the print server 133 to perform printing according to the created schedule of the print processing. At this point, the workflow PC 132 automatically instructs the print server 133 to perform printing according to the created schedule of the print processing or a worker who performs the printing work of the order (hereinafter referred to as "operator") instructs the print server 133 to perform printing.

The print server 133 has a function of converting the instruction for printing issued by the workflow PC 132 to a command in a format that can be interpreted by the printer 134 and a function of instructing the printer 134 to perform printing. The print server 133 also has a function of acquiring the operational status of the printer 134 and a progress status of a print job corresponding to each order (hereinafter correctively referred to as "status") from the printer 134 and a function of notifying the workflow PC 132 of the acquired status. Further, the print server 133 has a function of interrupting the print job in which the print server 133 already instructs the printer 134 to perform printing.

Upon receiving the print instruction from the workflow PC 132, the print server 133 instructs the printer 134 to perform printing.

When the printer 134 receives the print instruction from the print server 133 (hereinafter, a print instruction given to the printer 134 is referred to as a "print job"), the printer 134 performs printing according to the print setting designated as the print job.

The bookbinding machine 135 is an offline bookbinding machine for binding sheets output by the printer 134 in a book and includes a puncher machine, a case binding machine, a stapler, a ring binding machine. The bookbinding machine 135 is connected with the network to allow the collection of status of the bookbinding machine 135.

The printer 134 and the bookbinding machine 135 are different in installation configuration according to the printing laboratory 131.

Figure 2:
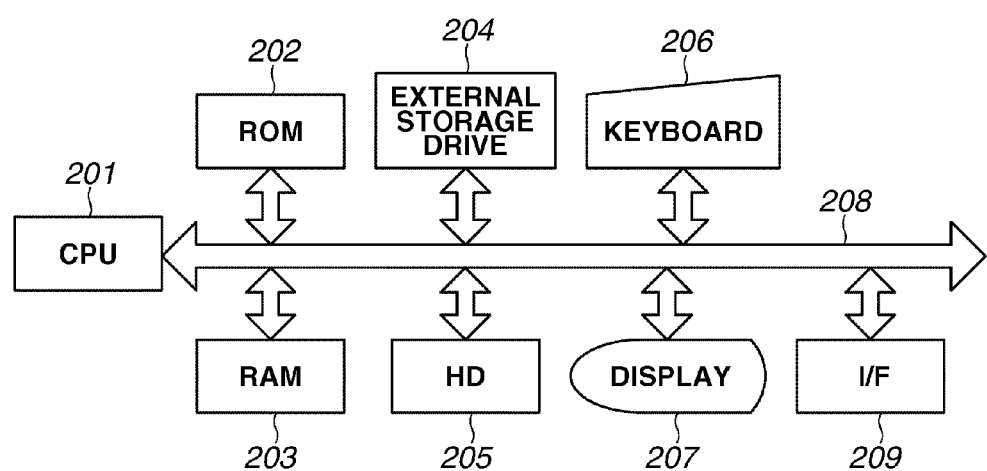
FIG. 2 is a schematic diagram illustrating an example of a hardware configuration of a print server.

FIG. 2 is a schematic diagram illustrating an example of a hardware configuration of the print server 133. A central processing unit (CPU) 201 executes an application program, an operating system (OS), and a network printer control program stored in a hard disk (HD) 205 and performs control for temporarily storing information and files required for executing the programs in a random access memory (RAM) 203.

A read only memory (ROM) 202 stores programs such as a basic input-output (I/O) program and various types of data such as font data used for processing documents and data for template.

The RAM 203 functions as a main memory and a work area of the CPU 201. The RAM 203 temporarily stores or retains a job list described below, for example. The RAM 203 is an example of a temporary storage apparatus.

An external storage drive 204 can load programs stored in a storage medium such as a digital versatile disc (DVD) and a universal serial bus (USB) memory onto a print server. The HD 205 stores an application program, an OS, a control program, and programs related thereto and can store various types of data.

A keyboard 206 is used by the operator to input various commands to the computer. The operator can input various commands to the computer via other input devices (not illustrated) such as a pointing device (not illustrated) and a microphone as well as the keyboard 206. The input devices are frequently connected to the CPU 201 via a serial port interface (not illustrated) coupled to a system bus 208. Alternatively, the input devices may be connected thereto via other interfaces such as a parallel port or a universal serial bus (USB).

A display 207 displays information or statuses input from the keyboard 206.

The system bus 208 controls the flow of data in the computer.

A network interface 209 is a communication interface for connecting the print server 133 to a local area network (LAN) or the Internet. The configuration illustrated in FIG. 2 is applicable to other computers such as the web server 122, the DB server 123, and the workflow PC 132.

The CPU 201 executes processing based on the program to realize the functions of the print server 133 and the processing illustrated in flow charts which are described below.

The workflow PC 132 is similar in the hardware configuration to the print server 133 illustrated in FIG. 2. The CPU of the workflow PC 132 executes processing based on the program stored in the HD of the workflow PC 132 to realize the functions of the workflow PC 132. Similarly, the printer 134 also includes a CPU and a memory. The CPU of the printer 134 executes processing based on the program stored in the memory of the printer 134 to realize the functions of the printer 134.

[Operation of Printing System]

FIG. 3 is an example of a sequence diagram illustrating a flow in which the print server 133 manages the progress status of the print job corresponding to the order in a case where the workflow PC 132 instructs the printer 134 to print each order.

In step S301, the print server 133 receives an instruction to print the order from the workflow PC 132. In step S302, the print server 133 issues a system job ID for a print job corresponding to the order and registers the issued system job ID in a job list stored therein, which is described in detail below. In step S303, the print server 133 notifies the workflow PC 132 of the system job ID issued in step S302.

In step S304, the workflow PC 132 associates the system job ID notified from the print server 133 in step S303 with the corresponding order. More specifically, the workflow PC 132 associates the system job ID notified by the print server 133 with the order ID stored in the order list stored therein and stores the system job ID in the order list, which are described in detail below.

In step S305, the workflow PC 132 transfers the document of the order to the print server 133.

Upon receiving the document in step S305, in step S306, the print server 133 converts the contents of the print instruction (i.e., a print instruction command and print setting) received in step S301 to a command of which format can be interpreted by the printer 134. In step S307, the print server 133 instructs the printer 134 to start the issuance of a print job using the print instruction command converted in step S306.

The printer 134 receives the print instruction from the print server 133 in step S307 and, in step S308, issues the printer job ID for the print job. In step S309, the printer 134 notifies the print server 133 of the printer job ID.

In step S310, the print server 133 associates the printer job ID notified from the printer 134 in step S309 with the corresponding print job. More specifically, the print server 133 associates the printer job ID notified from the printer 134 with the system job ID issued in step S302 and stores the printer job ID in the job list.

In step S311, the print server 133 transfers the document of the print job to the printer 134.

In step S312, the print server 133 instructs the printer 134 to end the issuance of the print job. When the printer 134 receives the instruction to end the issuance of the print job, the printer 134 starts the print processing (not illustrated) based on the print setting included in the instruction to start the issuance of the print job received in step S307 and the document received in step S311.

In step S313, when the printer 134 receives an instruction to acquire a status such as the progress status of the print job from the print server 133, in step S314, the printer 134 notifies the print server 133 of the corresponding status.

In step S315, the print server 133 associates the status notified from the printer 134 in step S314 with the corresponding print job. More specifically, the print server 133 associates the status notified from the printer 134 with the system job ID issued in step S302 and stores the status in the job list. In step S316, the print server 133 notifies the workflow PC 132 of the status.

The workflow PC 132 searches the system job ID associated with the order that the workflow PC 132 wants to confirm based on the status notified from the print server 133 in step S316, so that the workflow PC 132 can confirm the progress status of the print job corresponding to the order.

FIG. 4 illustrates examples of job lists stored in the print server 133.

The example of a job list 400(a) in FIG. 4 stores the system job ID issued by the print server 133, the printer job ID issued by the printer 134, and the progress status of the print job for each print job corresponding to each order. Further, the example of the job list 400(a) in FIG. 4 stores a status of print-job issuance processing (issuance processing status) in the print server 133 and order identification information (i.e., an order ID, job name, and job issuer).

The data for each print job in FIG. 4 is an example of print job data. The progress status of the print job includes types of, for example, "processing wait," "being received," "in image processing, "being printed," and "print completion." In the present exemplary embodiment, the progress of the print job follows the above sequence.

As illustrated in FIG. 4, the job list 400 includes a plurality of data pieces for each print job. If there is a plurality of printers, the print server 133 stores a job list for each printer.

A job list 400(b) illustrates an example of a job list at the time of the print server 133 being instructed to shut down. A job list 400(c) illustrates an example of a job list updated through the processing of the present exemplary embodiment after the print server 133 is instructed to shut down. The jobs whose type of the job issuance processing are "being issued" and "issuance wait" are deleted in the job list 400(c). As described in detail below, the print server 133, which receives the shut-down instruction, discards the job in the job list.

A job list 400(d) illustrates an example of a job list stored in the printer 134 at the time of the print server 133 being rebooted. The example stores the printer job ID issued by the printer 134 for each print job, the progress status of the print job, and identification information of the print job (an order ID, job name, and job issuer, for example).

A job list 400(e) illustrates an example of a job list updated through the operation at the time of the print server 133 being rebooted. The jobs whose type of the job progress status is "print completion" are deleted in the job list 400(e). As described in detail below, the print server 133 which is instructed to be rebooted compares the job list immediately before the shutdown with the printer job list at the time of reboot and updates the job list.

Figure 5:
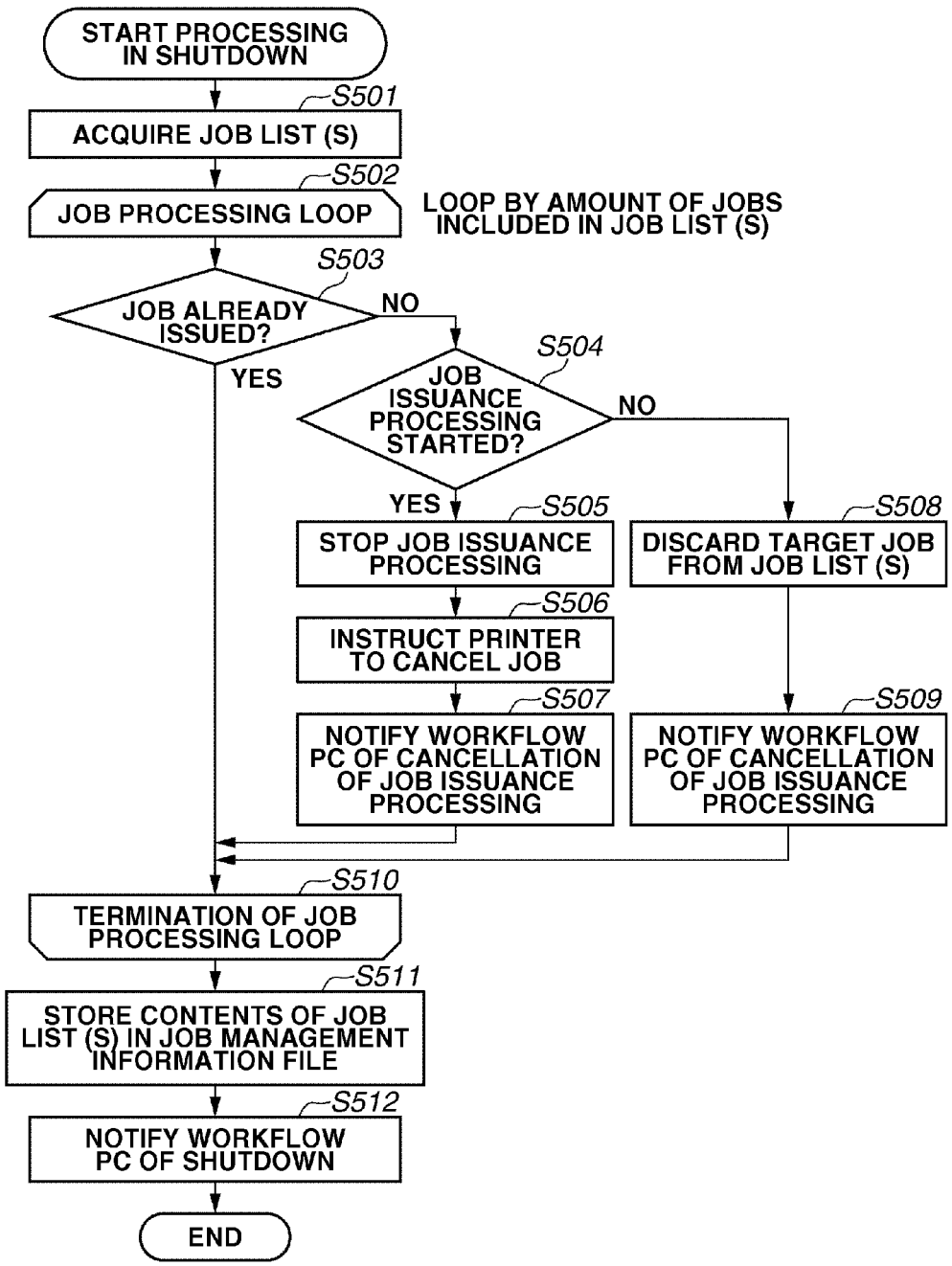
FIG. 5 is a flow chart illustrating an example of operations in a case where the print server is instructed to shut down.

FIG. 5 is a flow chart illustrating an example of operations in a case where the print server 133 is instructed to shut down. The shutdown is performed in a case where the print server is instructed to normally shut down and the OS notifies the program accordingly. In step S501, the print server 133 acquires the job list 400(b) illustrated in FIG. 4.

In steps S502 to S510, the print server 133 performs the issuance cancellation processing of each print job stored in the job list (S) acquired in step S501 as needed. The job list (S) is an example of a first job list. Step S502 is the beginning of the job processing loop.

In step S503, the print server 133 determines whether the issuance processing of the print job related to each job included in the job list (S) to the printer 134 is completed. If the print server 133 determines that the issuance processing of the print job is completed (YES in step S503), the processing proceeds to step S511. If the print server 133 determines that the issuance processing of the print job is not completed (NO in step S503), the processing proceeds to step S504.

In step S504, the print server 133 determines whether the issuance processing of the print job to the printer 134 is started. If the print server 133 determines that the issuance processing of the print job is started (YES in step S504), the processing proceeds to step S505.

If the print server 133 determines that the issuance processing of the print job is not started (NO in step S504), the processing proceeds to step S508. "Job issuance is being processed" means that data is being transferred from the print server 133 to the printer 134. In other words, "job issuance is being processed" refers to a state where data pieces such as a job issuance start command, print setting, image, image correction setting, and a job issuance end command are being transferred to the printer 134. It may take a long time depending on a job.

Steps S505 to S507 and steps S508 to S509 are print cancel processing.

If the issuance processing of the print job is started, in step S505, the print server 133 cancels the issuance processing of the print job to the printer 134. When the issuance processing is cancelled, the corresponding job is discarded from the job list (S).

In step S506, the print server 133 instructs the printer 134 to cancel the processing of the print job. In step S507, the print server 133 notifies the workflow PC 132 that the issuance processing of the print job is cancelled. The processing in step S507 is an example of processing for a notification of cancel.

If the issuance processing of the print job is not yet started, in step S508, the print server 133 discards the corresponding job in the job list (S). In step S509, the print server 133 notifies the workflow PC 132 that the issuance processing of the print job is cancelled. The processing in step S509 is an example of processing for the notification of cancel.

The notified workflow PC 132 updates the progress status of the job in the order list (for example, an order list 700(a)) described below. More specifically, the jobs in the order list in the workflow PC 132 notified in step S507 and in step S509 are changed to "blank" in the system job ID and "still to be issued" in the job progress so that it can be clear that the jobs are discarded in the print server 133.

Step S510 indicates the termination of the job processing loop starting in step S502.

In step S511, the print server 133 stores the contents of the job list (S) as a job management information file in a recording medium such as the HD 205. The HD 205 is an example of a storage apparatus.

In the print cancel processing in steps S505 to S509 described above, the reason why the issuance of jobs is cancelled or jobs are discarded depending on as to whether the issuance processing of the print job is started or not respectively is that only the job list (S) has to be stored. That is because, for example, if a job in which the issuance processing is not started is not discarded form the list, such a complicated processing as to store not only the job list but also the job list associated with contents or a print ticket is further required.

In step S512, the print server 133 notifies the workflow PC 132 that the print server 133 itself is shut down and ends the present processing.

For example, if the contents of the job list (S) acquired by the print server 133 in step S501 are the same as those of the job list 400(b) illustrated in FIG. 4, the contents of the job list (S) in step S511 are the same as those of the job list 400(c) illustrated in FIG. 4. Accordingly, the order list in the workflow PC 132 becomes similar to the job list 700(b) as described in detail below.

It is assumed that the same information as that of the job list 400 in FIG. 4 is stored in the job management information file in the present exemplary embodiment, however, the present invention is not limited to the present exemplary embodiment.

Figure 6:
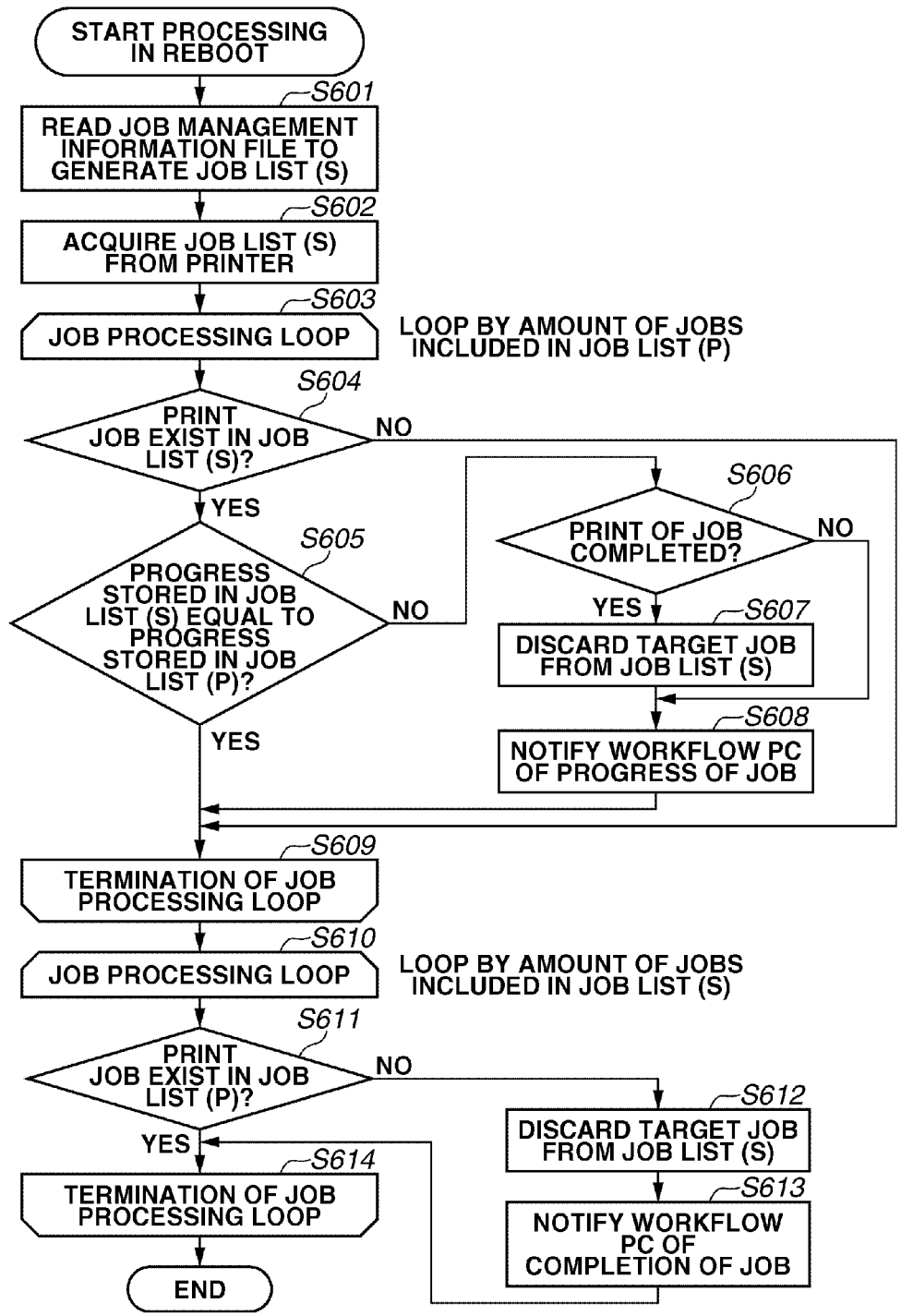
FIG. 6 is a flow chart illustrating an example of operations in a case where the print server is shut down and then rebooted.

FIG. 6 is a flow chart illustrating an example of operations in a case where the print server 133 is shut down and then rebooted.

In step S601, the print server 133 generates the job list (S) with reference to the job management information file described in step S511 in FIG. 5.

In step S602, the print server 133 acquires the job list (P) stored in the printer 134 therefrom. The job list (P) includes information pieces similar in type to those in the job list 400(*d*) illustrated in FIG. 4. The job list (P) illustrates an example of a second job list.

In steps S603 to S609, the print server 133 arranges the job list (S) generated in step S601 with reference to the job list (P) acquired in step S602. Step S603 is the beginning of the job processing loop.

In step S604, the print server 133 determines whether each job included in the job list (P) also exists in the job list (S). If the print server 133 determines that each job exists in the job list (S) (YES in step S604), the processing proceeds to step S605. If the print server 133 determines that each job does not exist in the job list (S) (NO in step S604), the processing proceeds to step S609.

In step S605, the print server 133 determines whether the contents set as the progress status of the print job are similar between the job list (P) and the job list (S). In other words, the print server 133 determines whether the progress status of the print job data to be processed included in the job list (S) is different from the progress status of the corresponding print job data included in the job list (P).

If the print server 133 determines that the progress status of the print job is similar therebetween (YES in step S605), the processing proceeds to step S609. If the print server 133 determines that the progress status of the print job is not similar therebetween (NO in step S605), the processing proceeds to step S606.

Steps S606 to S608 are a series of processing following change in the progress status of the print job.

If the print server 133 determines that the contents set as the progress status of the print job are not similar between the job list (P) and the job list (S), the print server 133 determines that the progress status of the print job is changed while the print server 133 is shut down and then rebooted.

In step S606, the print server 133 refers to the progress status of the job list (P) to determine whether the printer 134 completes the print processing of the print job. If the print server 133 determines that the printer 134 completes the print processing (YES in step S606), the processing proceeds to step S607. If the print server 133 determines that the printer 134 does not complete the print processing (NO in step S606), the processing proceeds to step S608.

In step S607, the print server 133 discards the corresponding job in the job list (S). In step S608, the print server 133 notifies the workflow PC 132 that the progress status of the print job is changed. The processing in step S608 is an example of processing for the notification of progress status.

The notified workflow PC 132 updates the progress status of the job in the order list described below. In other words, if the result in step S606 is "YES," "print is completed." Whereas, if the result in step S606 is "NO," the progress status of the job is that of the latest job acquired from the job list (P) such as "in image processing" or "being printed."

Step S609 indicates the termination of the job processing loop starting in step S603.

In steps S610 to S614, the print server 133 rearranges the job list (S) with reference to the job list (S) arranged in steps S603 to S609 and the job list (P) acquired in step S602. Step S610 is the beginning of the job processing loop.

In step S611, the print server 133 determines whether each print job included in the job list (S) also exists in the job list (P). If the print server 133 determines that each print job exists in the job list (P) (YES in step S611), the processing proceeds to step S614. If the print server 133 determines that each print job does not exist in the job list (P) (NO in step S611), the processing proceeds to step S612.

Steps S612 and S613 are a series of processing following the removal of the print job from the printer 134.

If the print server 133 determines that the job included in the job list (S) does not exist in the job list (P), the print server 133 determines that the printer 134 completes the print processing of the corresponding print job while the print server 133 is shut down and then rebooted. The print server 133 further determines that the corresponding print job is removed from the printer 134.

In step S612, the print server 133 discards the corresponding job from the job list (S).

In step S613, the print server 133 notifies the workflow PC 132 that the print processing of the print job is completed. The processing in step S613 is an example of processing for the notification of completion.

Step S614 indicates the termination of the job processing loop starting in step S610. If a series of processing related to all the print jobs included in the job list (S) is executed, the present processing is ended.

For example, a case is taken as an example where the contents of the job list (S) that the print server 133 acquires in step S601 are the job list 400(*c*) illustrated in FIG. 4, and the contents of the job list (P) that the print server 133 acquires in step S602 are the job list 400(*d*) illustrated in FIG. 4. The contents of the job list (S) in step S614 will be those in the job list 400(*e*) illustrated in FIG. 4. Accordingly, the order list in the workflow PC 132 becomes similar to an order list 700(*c*) as described in detail below.

FIG. 7 illustrates examples of order lists. The example of the order list 700(*a*) stores a printer for performing print processing, the system job ID issued by the print server 133, the progress status of the print job corresponding to the order, and order identification information for each order. The order identification information may include an order ID, job name, and job issuer, for example. The order list is an aggregation of orders (print orders) representing print instructions.

The order list is stored in the RAM or the HD of the workflow PC 132. The order list is an example of a print order list. As described above, when the workflow PC 132 is notified that the print server 133 is shut down, as illustrated in the order list 700(*b*), both jobs whose job progress status is "being received" and "processing wait" are changed to the jobs whose system job ID is "blank" and job progress status is "still to be issued." After the print server 133 is rebooted, the job progress status in the order list is further updated as illustrated in the order list 700(*c*).

After the print server 133 is rebooted, an instruction to print an order in which a job is not yet issued should be issued again. In such a case, the workflow PC 132 thus displays a dialog prompting the operator who operates the workflow PC 132 to issue the print instruction. Alternatively, the workflow PC 132 may automatically issue an instruction to successively print the job that is not yet issued.

The workflow PC 132 issues the instruction (reprint instruction) to successively print the print job that is not yet issued and in which a job issuance processing is cancelled to the print server 133 automatically or on the basis of the operator's instruction via the dialog. When the print server 133 receives the reprint instruction for the print job that is not yet issued from the workflow PC 132, the print server 133 adds the print job to the job list and executes the job issuance processing.

In the present exemplary embodiment, a single PC realizes the print control of the printer as an example of the print server 133 illustrated in FIG. 1, however, the present invention is not limited to the present exemplary embodiment. The functions of the print server 133 may be distributed to a plurality of PCs to distribute a load.

The job list 400 illustrated in FIG. 4 as a job list stored in the print server 133 is taken as an example, however, a configuration of information to be stored and a unit for storing the information are not limited to the present exemplary embodiment. For example, when the printer 134 is instructed to issue the print job, the system job ID and order identification information may be included in the print setting to be transmitted to the printer 134 to store the job list in the printer 134.

According to the present exemplary embodiment, the job list 400 illustrated in FIG. 4 is stored in the recording medium such as the HD 205 as the job management information file in step S511 in FIG. 5. However, a configuration of information to be stored as the job management information file and a unit for storing the information are not limited to the present exemplary embodiment.

According to the present exemplary embodiment, when the print server 133 is shut down, the job list stored therein is stored in the recording medium such as the HD 205 as the job management information file. The present exemplary embodiment is configured to restructure the job list based on the corresponding job management information file at the time of rebooting the print server 133. This configuration allows the workflow PC 132 to confirm the progress status of each order after reboot even if the print server 133 is shut down.

A second exemplary embodiment deals with the case where the job management information file described in the first exemplary embodiment is not stored. The second exemplary embodiment describes the processing for the case where the print server 133 is shut down before the job management information file is generated and the store processing of the job management information file is executed, for example. Even in such a case, the system according to the present exemplary embodiment can restructure the job list after the print server 133 is rebooted and enable the workflow PC 132 to confirm the progress status of each order.

The description of the portions common to those in the first exemplary embodiment, such as FIGS. 1 and 2, for example, is omitted herein. However, the processing in FIG. 6 is unique to the first exemplary embodiment. In the present exemplary embodiment, therefore, the processing in FIG. 8 is executed instead of the processing in FIG. 6.

FIG. 8 is a flow chart illustrating an example of operations in a case where the print server 133 is rebooted. In FIG. 8, the processing similar to that in FIG. 6 described in the first exemplary embodiment is given the same step number to omit the description thereof.

According to the present exemplary embodiment, the job is stored in the job list of the printer 134 even after print is completed and deleted from the job list of the printer 134 in response to a deletion operation of the user. Other than that, the present exemplary embodiment includes printer-job management methods such as a method for successively deleting jobs from the older one when the number of jobs existing in the job list of the printer 134 reaches a fixed number and a method for automatically deleting jobs when a certain period of time passes, however, the present invention is not limited to the present exemplary embodiment.

In step S604, the print server 133 determines whether each job included in the job list (P) also exists in the job list (S). If the print server 133 determines that each job exists in the job list (S) (YES in step S604), the processing proceeds to step S605. If the print server 133 determines that each job does not exist in the job list (S) (NO in step S604), the processing proceeds to step S901.

Steps S901 to S903 are a series of processing following the print server 133 discovering an unknown print job in the job list (P).

If the print server 133 determines that the job included in the job list (P) does not exist in the job list (S), the print server 133 determines that the job management information file cannot be normally generated when the print server 133 is shut down. Alternatively, the print server 133 determines that another print system (another print server or another print system according to the present exemplary embodiment) issues a new print job to the printer 134 while the print server 133 is shut down and rebooted.

In step S901, the print server 133 issues the system job ID to the corresponding job. In step S902, the print server 133 adds the corresponding job to the job list (S).

In step S903, the print server 133 notifies the workflow PC 132 of the addition of the print job to be managed and the progress status of the print job.

Figure 9:
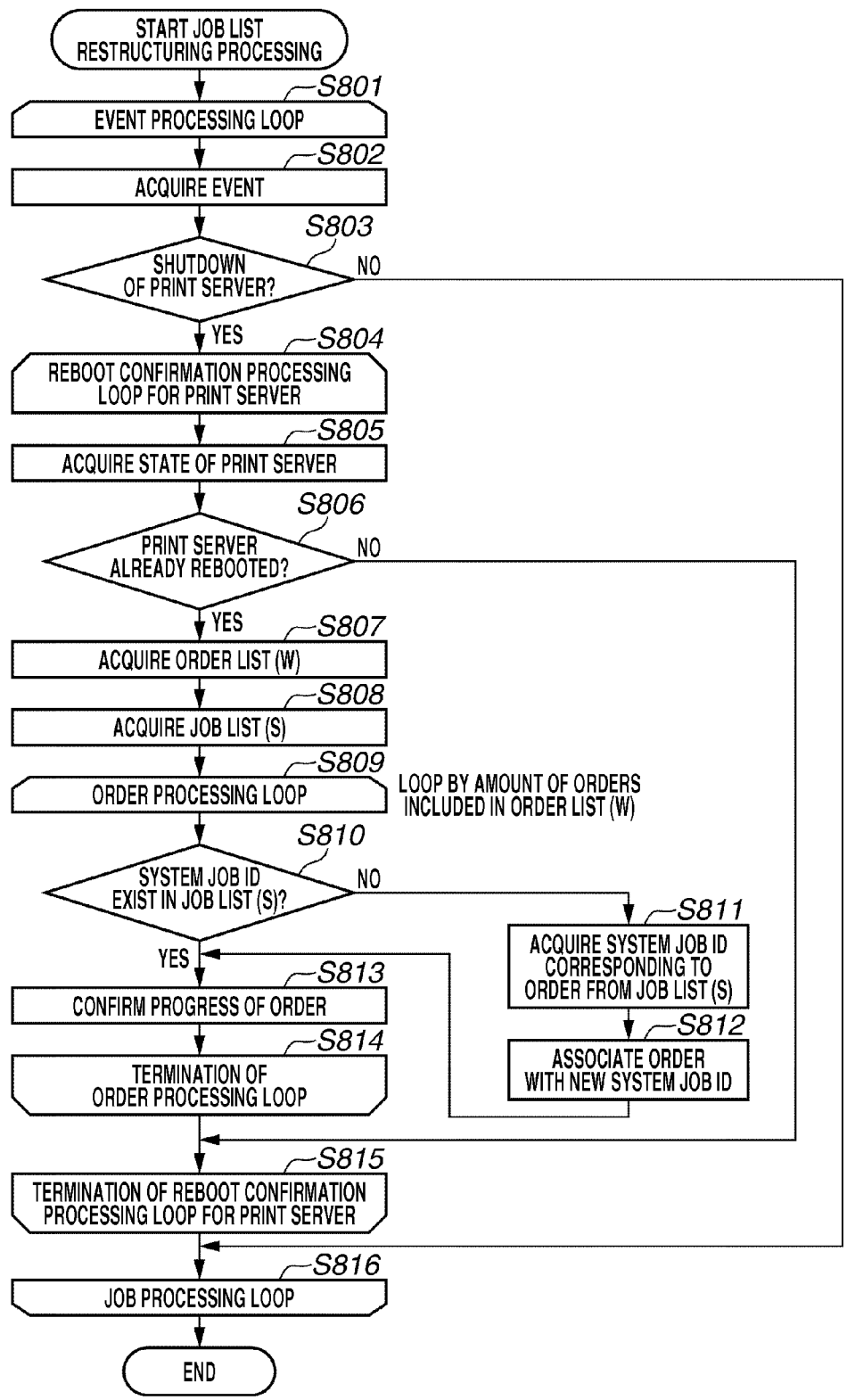
FIG. 9 is a flow chart illustrating an example of operations in a case where the workflow PC reconfirms a progress status of each order in response to the reboot of the print server.

FIG. 9 is a flow chart illustrating an example of operations in a case where the workflow PC 132 reconfirms the progress status of each order in response to the reboot of the print server 133.

Steps S801 to S816 represent an event processing loop. Step S801 is the beginning of the event processing loop. Then in step S802, the workflow PC 132 acquires an event.

In step S803, the workflow PC 132 determines whether the contents of the event are a notification of shutdown of the print server 133. If the workflow PC 132 determines that the contents of the event are the notification of shutdown (YES in step S803), the processing proceeds to step S804. If the workflow PC 132 determines that the contents of the event are not the notification of shutdown (NO in step S803), the processing proceeds to step S816.

In steps S804 to S815, the workflow PC 132 confirms whether the print server 133 is rebooted. Step S804 indicates the beginning of a reboot confirmation processing loop.

In step S805, the workflow PC 132 acquires the operational status of the print server 133. In step S806, the workflow PC 132 determines whether the print server 133 is rebooted. If the workflow PC 132 determines that the print server 133 is rebooted (YES in step S806), the processing proceeds to step S807. If the workflow PC 132 determines that the print server 133 is not rebooted (NO in step S806), the processing proceeds to step S815.

In step S807, the workflow PC 132 acquires an order list (W) illustrated in FIG. 7. In step S808, the workflow PC 132 acquires the job list (S) stored in the print server 133.

In steps S809 to S814, the workflow PC 132 confirms the progress status of each order included in the order list with reference to the order list (W) acquired in step S807 and the job list (S) acquired in step S808. Step S809 is the beginning of an order processing loop.

In step S810, the workflow PC 132 determines whether the system job ID of the print job corresponding to each order included in the order list (W) exists in the job list (S). If the workflow PC 132 determines that the system job ID exists in the job list (S) (YES in step S810), the processing proceeds to step S813. If the workflow PC 132 determines that the system job ID does not exist in the job list (S) (NO in step S810), the processing proceeds to step S811.

In step S811, the workflow PC 132 searches the print job in the job list (S) with use of the order ID corresponding to the relevant order to acquire the system job ID of the corresponding print job.

In step S812, the workflow PC 132 associates the system job ID acquired in step S811 with the corresponding order. More specifically, the workflow PC 132 overwrites the system job ID associated with the order ID stored in the order list with the system job ID acquired in step S811.

In step S813, the workflow PC 132 searches the print job in the job list (S) to acquire the progress status of the print job corresponding to the relevant order, and confirms the contents thereof. Step S814 indicates the termination of the order processing loop starting in step S809.

If the workflow PC 132 confirms the print status of all orders included in the order list (W), the processing proceeds to step S815. Step S815 indicates the termination of the reboot confirmation processing loop starting in step S804.

If the workflow PC 132 confirms the reboot of the print server 133, the processing proceeds to step S816. Step S816 indicates the termination of the event processing loop starting in step S801. If a series of processing starting at the event is not required any longer, the present processing is ended.

According to the present exemplary embodiment described above, even if the print server 133 is forcibly shut down, for example, before the generation of the job management information file and the storing processing are executed, the job list can be restructured after the print server 133 is rebooted. Accordingly, the workflow PC 132 can confirm the progress status of each order.

According to the exemplary embodiments, even if the print server is shut down, the progress status of a job can be surely reproduced after reboot.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium). In an example, a computer-readable medium may store a program that causes a print server apparatus, a printer, or an information processing apparatus to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-027505 filed Feb. 10, 2011, which is hereby incorporated by reference herein in its entirety.

What is claimed is:

1. A print server apparatus to communicate with a printer, the print server apparatus comprising:
   a holding unit configured to store an original job list including a plurality of print job data pieces in a temporary storage apparatus, wherein each of the plurality of print job data pieces includes a progress status of a print job and a status of issuance processing of the print job;
   a change unit configured to discard, in response to a shutdown instruction being received, print job data whose status of issuance processing is in issuance wait from the original job list;
   a storing unit configured to store a first job list changed by the change unit in a storage apparatus, wherein a number of print job data pieces included in the first job list is smaller than a number of print job data pieces included in the original job list;
   an acquisition unit configured to acquire, from the printer, a second job list including a plurality of print job data pieces including a progress status of a print job in response to the print server apparatus being rebooted; and
   an update unit configured to update the first job list stored in the storage apparatus based on the second job list acquired by the acquisition unit.

2. The print server apparatus according to claim 1, wherein, in response to the print job data pieces included in the second job list being included in the first job list, the update unit discards the print job data included in the first job list whose progress status is different from that of corresponding print job data included in the second job list and is in print completion from the first job list and discards the print job data in which the corresponding print job data does not exist in the second job list among the print job data pieces included in the first job list from the first job list.

3. The print server apparatus according to claim 2, wherein, in response to print job data pieces included in the second job list not being included in the first job list, the update unit adds the print job data to the first job list stored in the storage apparatus.

4. The print server apparatus according to claim 3, wherein the print server apparatus further is to communicate with an information processing apparatus, the print server apparatus further comprising a notification unit configured to notify, in response to print job data pieces included in the second job list not being included in the first job list, the information processing apparatus of addition of the print job data and the progress status of the print job data.

5. The print server apparatus according to claim 1, wherein the print server apparatus further is to communicate with an information processing apparatus, the print server apparatus further comprising a cancel notification unit configured to notify, in response to a shutdown instruction being received, the information processing apparatus of cancellation of the issuance processing of a print job of print job data whose status of issuance processing is in issuance and in issuance wait among the print job data pieces included in the original job list stored in the temporary storage apparatus.

6. The print server apparatus according to claim 5, further comprising:
   a progress status notification unit configured to notify the information processing apparatus of the progress status of print job of print job data, among the print job data pieces included in the first job list stored in the storage apparatus, which is different from the progress status of the corresponding print job data included in the second job list; and
   a completion notification unit configured to notify the information processing apparatus of completion of the print job of the print job data in which the corresponding print job data does not exist in the second job list among the print job data pieces included in the first job list.

7. The print server apparatus according to claim 5, further comprising a reception unit configured to receive an instruction to reprint the print job in which the issuance processing is cancelled from the information processing apparatus after the print server apparatus is rebooted.

8. A method for processing information executed by a print server apparatus configured to communicate with a printer, the method comprising:
   storing an original job list including a plurality of print job data pieces in a temporary storage apparatus, wherein each of the plurality of print job data pieces includes a progress status of a print job and a status of issuance processing of the print job;
   discarding, in response to a shutdown instruction being received, print job data whose status of issuance processing is in issuance wait from the original job list;
   storing a changed first job list in a storage apparatus, wherein a number of print job data pieces included in the first job list is smaller than a number of print job data pieces included in the original job list;
   acquiring, from the printer, a second job list including a plurality of print job data pieces including a progress status of a print job in response to the print server apparatus being rebooted; and
   updating the first job list stored in the storage apparatus based on the acquired second job list.

9. A non-transitory a computer-readable medium storing a program that causes a print server apparatus configured to communicate with a printer to perform the method according to claim 8.

10. The method according to claim 8, wherein, in response to the print job data pieces included in the second job list being included in the first job list, updating includes discarding the print job data included in the first job list whose progress status is different from that of corresponding print job data included in the second job list and is in print completion from the first job list and discards the print job data in which the corresponding print job data does not exist in the second job list among the print job data pieces included in the first job list from the first job list.

11. The method according to claim 10, wherein, in response to print job data pieces included in the second job list not being included in the first job list, updating includes adding the print job data to the first job list stored in the storage apparatus.

12. The method according to claim 11, wherein the method further is to communicate with an information processing apparatus, the method further comprising notifying, in response to print job data pieces included in the second job list not being included in the first job list, the information processing apparatus of addition of the print job data and the progress status of the print job data.

13. The method according to claim 8, wherein the method further is to communicate with an information processing apparatus, the method further comprising notifying, in response to a shutdown instruction being received, the information processing apparatus of cancellation of the issuance processing of a print job of print job data whose status of issuance processing is in issuance and in issuance wait among the print job data pieces included in the original job list stored in the temporary storage apparatus.

14. The method according to claim 13, further comprising:
   notifying the information processing apparatus of the progress status of print job of print job data, among the print job data pieces included in the first job list stored in the storage apparatus, which is different from the progress status of the corresponding print job data included in the second job list; and
   notifying the information processing apparatus of completion of the print job of the print job data in which the corresponding print job data does not exist in the second job list among the print job data pieces included in the first job list.

15. The method according to claim 13, further comprising receiving an instruction to reprint the print job in which the issuance processing is cancelled from the information processing apparatus after the print server apparatus is rebooted.

* * * * *